United States Patent Office 3,306,943
Patented Feb. 28, 1967

3,306,943
PROCESS FOR THE PREPARATION OF
p-DIISOPROPYLBENZENE
Jozef Sulo, Castrop-Rauxel, and Hans Binder, Frankfurt am Main-Sud, Germany, assignors to Rutgerswerke-Aktiengesellschaft, Frankfurt am Main, Germany
No Drawing. Filed June 9, 1964, Ser. No. 373,868
Claims priority, application Germany, July 9, 1963, R 35,632
1 Claim. (Cl. 260—671)

This invention relates to the alkylation of benzene and cumene and it has particular relation to the preparation of p-diisopropylbenzene.

It has been known that benzene or cumene can be alkylated with propene in the presence of Lewis-acids. It has also been known that alkylbenzene can be disproportioned by aluminum chloride. It has been likewise known that the equilibrium can be shifted in favor of the p-isomer, by isomerization.

However, the Lewis-acids, particularly the aluminum chloride, act also as catalysts of polymerization, condensation, dealkylation and dehydrogenation. From this it follows that the use of these catalysts may cause many side reactions and the respective process must be carefully adjusted if the desired product is supposed to be obtained in satisfactory yields.

In the alkylation of cumene by means of aluminum chloride the m-isomer is particularly preferred. Therefore, it has been frequently tried to proceed in the presence of solid catalysts having an acid reaction, such as for example silicic acid impregnated with suitable boron compounds, in order to shift the m/p-ratio in favor of the p-isomer. However, a disadvantage of this process consists in that the o-isomer is also formed and the latter causes particular difficulties in the separation of the individual compounds.

According to the processes known from the art, a product is obtained which contains a maximum of 55–60% of the p-isomer in the fraction of diisopropylbenzene.

It is, therefore, the main object of the present invention to provide for the recovery of the p-diisopropylbenzene a process which is economical and efficient on a commercial scale and yields a product which is free from by-products, such as o-diisopropylbenzene and trimethylindan.

It has now been found that in the preparation of p-diisopropylbenzene not only the amount of catalysts, the temperature and the mol-proportion of propene to aromatic hydrocarbon have a decisive influence, but also the time of the reaction. It has been unexpectedly found that by using low temperatures—which particularly promote the formation of undesired aromatic substances of higher alkylation in the known processes—an increased velocity of introducing propene into the reaction and shortening of the period of reaction time, undesired side-reactions can be eliminated and the yield of the desired p-diisopropylbenzene can be considerably increased. Furthermore, a higher ratio propene: aromatic hydrocarbon can be used, without the danger of polymerization of propene and without the formation of unduly higher amounts of aromatic substances of higher alkylation, than that desired.

The low reaction temperature prevents also reactions of isomerization, condensation dealkylation and cleavage.

If the velocity of introducing the propene into the mixture of hydrocarbon and aluminum chloride is increased, the formation of aromatic substances of higher alkylation and also the formation of propene polymers, as well as condensation products, is reduced and the yield of p-diisopropylbenzene of high purity is particularly increased.

In carrying out the invention with high velocity of introducing the propene, the invention is conducted in such manner that all of the propene is absorbed. Thus, preparation of p-diisopropylbenzene of high purity can be attained according to the present invention, by causing to react 0.3–1 mol propene with 1 mol cumene, and 0.6–2 mols propene with 1 mol benzene in the presence of aluminum chloride, at a concenrtation of 1–30 mol percent, based on benzene or cumene, at a temperature of —30 to +60° C., during a reaction period of less than 100 minutes.

The process of the invention can be carried out discontinuously, as well as in a continuous cyclic process.

According to a continuous embodiment of the invention, a charge of cumene or benzene and AlCl$_3$, is continuously introduced into an alkylation zone, mixed with propene gas, continuously discharged and the catalyst-complex-phase is separated from the oily phase. The catalyst-complex-phase can be either continuously introduced again into the alkylation zone, or decomposed by means of water and/or sodium hydroxide solution. The oily phase is washed with suitable washing liquid, for example a solution of sodium carbonate, the oily layer is separated and the p-diisopropylbenzene is recovered by distillation. The unreacted cumene and/or benzene and the isopropylbenzenes of higher alkylation, are returned to the alkylation zone.

In the discontinuous procedure, after terminating the alkylation, the complex phase is mixed with water, in order to decompose the residual aluminum chloride and after separation of the aqueous layer the hydrocarbon mixture is neutralized, dried, and the p-diisopropylbenzene is recovered by distillation. The residual products can be untilized in the next batch.

The following examples describe by way of example some specific embodiments and best modes for carrying out the process of the invention, to which the invention is not limited.

EXAMPLE 1

240 g. of cumene and 7 g. of aluminum chloride are alkylated at a temperature of about 10° C. for 25 minutes by mixing with 42 g. propene in a conventional alkylating apparatus. After the reaction is terminated, the complex phase is decomposed with ice water and the separated oily phase, which is neutralized with aqueous sodium carbonate solution is separated from the aqueous phase and dried in conventional manner. The dried product is subjected to fractional distillation.

Thereby the following products are obtained: 152 g. of alkylated product containing 114.4 g. of diisopropylbenzene fraction, which yields by careful rectification 74.4 g. of p-diisopropylbenzene, corresponding to a content of 65% of p-isomers. No o-diisopropylbenzene was present.

EXAMPLE 2

240 g. of cumene and 7 g. of aluminum chloride are alkylated with 42 g. of propene at a temperature of 0° C. for 25 minutes in a conventional alkylating apparatus. After termination of the reaction, the complex phase is decomposed with ice water and the oily phase obtained is neutralized, as in Example 1, and then separated from the aqueous phase formed, dried and then subjected to fractional distillation.

180 g. of alkylated products are thus obtained, from which 109.5 g. of a diisopropylbenzene fraction are recovered. By rectification of this fraction, 75.8 g. of p-diisopropylbenzene are obtained. No o-diisopropylbenzene was present.

EXAMPLE 3

240 g. of cumene and 12 g. of aluminum chloride are alkylated with 42 g. of propene at a temperature of −10° C. in a conventional alkylating apparatus for 25 minutes. After termination of the reaction, the complex phase is mixed with ice water, whereby an aqueous and an oily phase are formed. The oily phase is neutralized as in the above Example 1, dried and subsequently subjected to fractional distillation.

The following products are thereby obtained: 160.3 g. of alkylated products containing 38.7 g. of m-diisopropylbenzene and 70.3 g. of p-diisopropylbenzene. The m/p ratio amounts to 35.4:64.6%.

EXAMPLE 4

78 g. of benzene and 3.5 g. of aluminum chloride are alkylated with 80 g. of propene at a temperature of about 5° C. in a conventional alkylating apparatus for 60 minutes. After the reaction is terminated, the complex phase is decomposed with ice water and the oily phase obtained is neutralized, as in Example 1, and then separated from the aqueous phase formed, and dried. The dried product is subjected to fractional distillation.

148 g. of alkylated products are thus obtained, from which 31.3 g. of a cumol, 71.5 g. of a diisopropylbenzene fraction are recovered. By rectification of this fraction 47.2 g. of p-diisopropylbenzene are obtained. No o-diisopropylbenzene was found. The m/p ratio amounts to 34:66%.

It will be understood that the present invention is not limited to the specific temperatures, proportions and other details specifically stated in the examples and can be carried out with various modifications, within the ranges disclosed and claimed herein. Fractional distillation of the oil phase is carried out under ordinary atmospheric or reduced pressure. The parts and percent stated herein are by weight if not otherwise stated.

What is claimed is:

A process for preparing p-diisopropylbenzene by alkylation of cumene with propylene in the presence of aluminum chloride as catalyst, essentially consisting of forming an alkylation mixture from 2 gram-mol of cumene, one gram-mol of propylene, and 7–12 g. of aluminum chloride, carrying out alkylation in said mixture at a temperature in the range of −10 to +10° C., during a reaction period of about 25 minutes, separating the diisopropylbenzene formed by treating the alkylation mixture with ice water to form an aqueous and an oily layer separating and neutralizing the latter and then subjecting it to fractional distillation.

References Cited by the Examiner
UNITED STATES PATENTS 3,109,037 10/1963 Shmidl _____ 260—671
3,129,255 4/1964 Hay et al. _____ 260—671

DELBERT E. GANTZ, *Primary Examiner.*

C. R. DAVIS, *Assistant Examiner.*